United States Patent [19]
Valdo et al.

[11] 3,769,001
[45] Oct. 30, 1973

[54] METALLURGICAL PROCESS FOR RECOVERING ALUMINUM FROM ALUMINUM SCRAP

[75] Inventors: Alex R. Valdo; Currie B. Berry, both of Baton Rouge, La.

[73] Assignee: Ethyl Corporation, Richmond, Va.

[22] Filed: May 3, 1971

[21] Appl. No.: 139,854

[52] U.S. Cl. .................................... 75/68 R, 75/65
[51] Int. Cl. ............................................ C22b 21/06
[58] Field of Search ......................... 75/65, 68, 68 R

[56] References Cited
UNITED STATES PATENTS

| | | | |
|---|---|---|---|
| 2,170,863 | 8/1939 | Junker | 75/65 R |
| 1,950,967 | 3/1934 | Bonsack | 75/68 R |
| 1,180,435 | 4/1916 | Robison | 75/65 R |
| 3,085,124 | 4/1963 | Upton | 75/65 R X |
| 3,206,182 | 9/1965 | Ankerson | 75/65 R X |
| 3,215,421 | 11/1965 | Ankerson | 75/68 R X |
| 3,536,478 | 10/1970 | Ankerson | 75/68 R X |
| 2,987,391 | 6/1961 | Foster et al. | 75/68 R |

FOREIGN PATENTS OR APPLICATIONS

| | | | |
|---|---|---|---|
| 175,242 | 11/1922 | Great Britain | 75/68 R |
| 640,195 | 7/1950 | Great Britain | 75/68 R |

*Primary Examiner*—L. Dewayne Rutledge
*Assistant Examiner*—M. J. Andrews
*Attorney*—Donald L. Johnson, John F. Sieberth and Paul H. Leonard

[57] ABSTRACT

A method of recovering aluminum from foamed aluminum utilizing an initial heel of molten aluminum, heavy fluxing with a mixture of sodium chloride, potassium chloride and cryolite, and submersion of the foamed aluminum in the molten aluminum.

2 Claims, No Drawings

METALLURGICAL PROCESS FOR RECOVERING ALUMINUM FROM ALUMINUM SCRAP

The present invention is in the field of metallurgy and relates particularly to the recovery of aluminum from foamed aluminum.

Present commercial processes for recovering aluminum from foamed aluminum scrap result in only about a 50 percent recovery of aluminum.

The present invention provides a process wherein 80 to 95 percent or more of the aluminum in foamed aluminum scrap may be recovered. The invention is also economical.

In a preferred embodiment of the instant invention, a quantity of fresh aluminum or aluminum alloy is placed in a suitable furnace and heated to a temperature sufficiently high to achieve a molten state. Subsequently a large quantity of flux, about 20–50 percent by weight of the aluminum metal is charged. A flux comprising sodium chloride, potassium chloride and cryolite is particularly preferred. The total melt is allowed to soak for a short period of time, usually about 5 minutes. After soaking, a charge of foamed aluminum approximately equal to the weight of the aluminum and previously crushed or broken to a suitable size for melting is added to the molten bath of aluminum and flux. The foamed aluminum pieces are held beneath the surface of the molten bath until completely melted. The dross and flux are skimmed from the surface of the molten bath and the molten aluminum is poured into a mold or other casting container. Aluminum recoveries are up to 95 percent.

The following examples illustrate the effectiveness of the metallurgical process of the present invention.

EXAMPLE I

A charge of 100 grams of virgin aluminum pig was placed in a graphite crucible and melted at 835°C. A charge of 50 grams of flux (47.5 percent sodium chloride, 47.5 percent potassium chloride and 5 percent cryolite by weight) was added to the molten aluminum and the total melt was soaked for 5 minutes. A charge of 97.5 grams of scrap foamed aluminum of various size pieces was added to the molten bath and pushed under the molten bath until completely melted. The dross was skimmed off the top of the bath and the molten aluminum was poured into a small casting mold and allowed to cool. The total aluminum recovered was 188.5 grams or a melt efficiency or recovery of 95.4 percent or 90.8 percent based on weight of foamed metal. 37.5 grams of dross and flux was also recovered.

EXAMPLE II

A charge of 125 pounds of fresh AlMag 35 or AA 535 aluminum alloy was placed in a 600 pound Lindberg furnace and melted at 1,100°–1,400°F. After the alloy had melted, the furnace temperature was set at 1,450°F. A flux of 25 pounds of a mixture of 47.5 percent sodium chloride, 47.5 percent potassium chloride and 5 percent cryolite by weight was then added to the molten metal. The total melt was soaked for about 60 minutes. The melt was tested periodically by raking a stirrer through the melt. A charge of 100 pounds of crushed foamed aluminum scrap was added to the molten bath and held beneath the surface during melting. The dross and flux were removed from the bath and the molten aluminum metal was poured into a casting mold and allowed to cool. The total aluminum recovered was 205 pounds or a melt efficiency or recovery of 80 percent. It was noted that the dross contained droplets of molten aluminum, and with careful squeezing of the dross the melt efficiency can be even further improved.

EXAMPLE III

The procedure of Example II was followed except as follows:
Initial charge — 126 pounds of fresh AlMag or AA 535
Flux — 5,147 grams potassium chloride
5,147 grams sodium chloride
544 grams cryolite
(weight selection was made on basis of only 5,147 grams of potassium chloride being on hand)
Foamed Aluminum Scrap — 99.5 pounds prepared from AlMag alloy
Total aluminum recovered was 195 pounds or a melt efficiency of 70 percent.

EXAMPLE IV

The procedure of Example II was repeated except as follows:
Flux — 5,391 grams of sodium chloride
5,391 grams of potassium chloride
568 grams of cryolite
Total aluminum recovered was 195 pounds or a melt efficiency of 70 percent.

EXAMPLE V

The procedure of Example II was followed except that the flux used was as follows:
5,391 grams of sodium chloride
5,391 grams of potassium chloride
568 grams of cryolite
The results were substantially the same as in Example III

EXAMPLE VI

The procedure of Example II was followed except as follows:
Initial charge — 126 pounds of fresh AlMag 35 OR AA 535
Flux — 5391 grams or 11.9 pounds of sodium chloride
5,391 grams or 11.9 pounds of potassium chloride
568 grams or 1.3 pound of cryolite
Foamed Aluminum Scrap — 98 pounds prepared from AlMag alloy
Total aluminum recovered was 209 pounds or a melt efficiency of 80 percent.

In Examples III–VI, the aluminum was recovered as foamed aluminum rather than regular aluminum as in Examples I and II. In these later examples, the molten aluminum metal was foamed in accordance with normal foaming procedures described hereinafter prior to casting. During foaming procedures, approximately 10 to 15 pounds of aluminum was lost in handling, thus accounting for the slight loss in melt efficiency as compared with Example II.

In addition to the foregoing flux of 47.5 % NaCl, 47.5% KCl and 5% cryolite, which is particularly preferred, the following fluxing compositions in weight percent also produce excellent results:
a. 40% NaCl, 40% KCl and 20% cryolite
b. 45% NaCl, 45% KCl and 10% cryolite Flux or flux compositions which are particularly preferable are those comprising cryolite, sodium chloride and potassium chloride wherein the compounds are distributed in weight percent from about 5–20 percent, 40–47.4 percent and 40–47.5 percent, respectively.

In general, the flux or flux composition of the present invention is a material such as natural or synthetic cryolite or a mixture of an aluminum fluoride compound with one or more of a sodium, lithium, potassium or calcium chloride or fluoride. Broadly, a preferred composition of the instant invention in percentages by weight is as follows:

Cryolite or aluminum fluoride — 5–100%
Sodium chloride or fluoride — 0–95%
Potassium chloride or fluoride — 0–95%
Calcium chloride or fluoride — 0–95%

Alternatively, a flux comprising a fluoride of sodium, potassium, lithium or calcium and a chloride of sodium, potassium, lithium or calcium may be used.

Some examples of suitable flux compositions in mole-percent are:

a. $LiF-AlF_3$ ($LiF-85\%$, $AlF_3-15\%$; $LiF-64\%$, $AlF_3-36\%$)
b. $LiF-NaF-AlF_3$ ($LiF-39.1\%$, $NaF-39.1\%$, $AlF_3-21.8\%$)
c. $NaF-AlF_3$ ($NaF-53\%$, $AlF_3-47\%$)
d. $NaF-NaCl$ ($NaF-50\%$, $NaCl-50\%$)
e. $NaF-KF-AlF_3$ ($NaF-32\%$, $KF-48\%$, $AlF_3-20\%$)
f. $NaF-NaCl-AlF_3$ ($NaF-35\%$, $NaCl-51\%$, $AlF_3-14\%$)
g. $KF-AlF_3$ ($KF-55\%$, $AlF_3-45\%$)
h. $KF-LiF-AlF_3$ ($KF-47.5\%$, $LiF-47.5\%$, $AlF_3-5\%$)
i. $LiCl-KCl-Na_3AlF_6$ ($LiCl-48\%$, $KCl-32\%$, $Na_3AlF_6-20\%$)
j. $LiCl-NaCl-Na_3AlF_6$ ($LiCl-56\%$, $NaCl-24\%$, $Na_3AlF_6-20\%$)
k. $NaCl-Na_3AlF_6$ ($NaCl-60\%$, $Na_3AlF_6-40\%$)
l. $NaCl-CaF_2$ ($NaCl-80\%$, $CaF_2-20\%$; $NaCl-70\%$, $CaF_2-30\%$)

Other suitable fluxes may be used without departing from the scope of the invention. The flux must be one, however, which does not excessively contaminate the foamed aluminum or aluminum or undergo a chemical reaction with the foamed metal to introduce undesirable metal impurities. The boiling point of an ideal flux is one which is above the best fluid state of the aluminum, i.e., the molten aluminum at its minimum viscosity. A flux having a boiling point about 200°C above the temperature of the molten aluminum is particularly desirable.

The amount of flux used is preferably from about 20 percent to about 50 percent by weight of fresh or virgin aluminum or aluminum alloy used in the process. Greater amounts may be used, but it is usually uneconomical to use more than is actually required.

The minimum temperature at which the recovery process may be carried out is the lowest temperature at which both metal and flux are molten, about 700°C. The maximum temperature for the process is the highest temperature below the boiling point of the flux or flux composition, about 900°C–1,400°C depending upon the particular flux composition.

The minimum soaking time is the period of time necessary to permit all components to become molten. Although there is no specific maximum soaking time, economics would dictate that this step in the process be carried out no longer than necessary, i.e., until such time as all components, metal, flux, etc., are in a complete molten state.

The amount of scrap foamed metal to be treated may vary from about 80 percent to about 100 percent by weight of fresh or virgin aluminum or aluminum alloy used in the process.

Although the invention is illustrated as a batch process, it may also be carried out in a continuous process or in a semicontinuous process. In such processes, the operation is preferably commenced anew when the flux becomes dirty. Alternatively, a portion of the flux may be removed and replaced with an approximately equal quantity of fresh or new flux upon the addition of each charge of scrap foamed aluminum.

The foamed aluminum used in the present process is normally scrap foamed aluminum prepared by processes known in the art. In general, such processes involve blowing molten aluminum or aluminum alloy with a suitable gas generating agent such as lithium hydride, titanium hydride, zirconium hydride and the like. Air properly entrained in the molten metal may also be used in preparing such metal foam. Where a blowing agent such as a metal hydride is used, a viscosity control additive may be used in the molten metal during the foaming process to aid in controlling foam density and pore uniformity. Representative examples of suitable processes for preparing foamed metal are found in U. S. Pat. Nos. 3,297,431, 3,300,296 and 3,305,902.

The density of the foamed aluminum may vary over a wide range usually ranging from about 5 to about 50 pcf (pounds per cubic foot). Densities of from about 8 to about 27 pcf are most common and densities of about 5 to about 35 pcf are quite common.

Foamed aluminum is customarily prepared from substantially pure aluminum or aluminum alloys containing 80 percent or more and preferably 90 percent or more aluminum. The following aluminum alloys (Aluminum Association Designations-AA) are examples of useful alloys for preparing foamed aluminum:

7,075 (1.6% Cu, 2.5% Mg, 0.3% Cr, 5.6% Zn, remainder Al)
2024 (4.5% Cu, 0.6% Mn, 1.5% Mg, remainder Al)
5086 (0.45% Mn, 4.0% Mg, 0.1% Cr, remainder Al)
6063 (0.4% Si, 0.7% Mg, remainder Al)
535 or AlMag 35 (6–8% Mg in Al)
1000 series Al (99.6% minimum Al)
2011 (5.5% Cu, 0.5% Pb, 0.5% Bi, remainder Al)
2218 (4.0% Cu, 1.5% Mg, 2% Ni, remainder Al)
3005 (1.2% Mg, 0.4% Mg, remainder Al)
4032 (12.2% Si, 0.9% Cu, 1.1% Mg, 0.9% Ni, remainder Al)
4043 (5% Si, 95% Al)
8280 (1.5% Si, 1.0% Cu, 0.5% Ni, remainder Al)
Magnalium — 70% Al, 30% Mg The foregoing disclosure and description of the invention is illustrative and explanatory thereof and various changes may be made within the scope of the appended claims without departing from the spirit of the invention.

What is claimed is:

1. In the method of recovering aluminum from aluminum scrap by adding the scrap to and melting it in a body of flux-covered molten aluminum, the improvement according to which the scrap aluminum is foamed aluminum, the foamed scrap is crushed before it is added to the molten aluminum, and the molten aluminum is covered with about one-fifth to about one-half its weight of flux.

2. The combination of claim 1 in which the amount of scrap foamed aluminum added is about 80 to 100 percent of the quantity of molten aluminum to which it is added.

* * * * *